Patented Dec. 30, 1941

2,268,206

UNITED STATES PATENT OFFICE 2,268,206

PARASITICIDAL MATERIAL

Albert K. Epstein and Benjamin R. Harris,
Chicago, Ill.

No Drawing. Application April 1, 1940,
Serial No. 327,252

23 Claims. (Cl. 167—22)

This invention relates to new and useful fungicides, insecticides, or parasiticides and the like and is particularly concerned with improved materials which are employed in the treatment of plants, household animals and for combating fungus diseases and insect infestations.

It is well known that insecticidal, fungicidal and similar compositions have a widespread use for horticultural and agricultural purposes, where they are used in the form of sprays or the like, for the combating of plant diseases, for the extermination of insects and parasites, for use as sheep dips, and for many other similar purposes. In the class of insecticides, it is known that certain types of such materials or compositions are stomach or internal poisons. Insects of the type which eat plant tissues are destroyed by distributing over the surfaces of the plant material such stomach or internal poisons with the result that when such plant material is eaten by the insects, the latter are killed. There is another class of insecticides which destroys the insects by suffocating or paralyzing them. In this case, when the insects suck or pierce the epidermis of a leaf or plant tissue having distributed thereover the particular type of insecticide in question, said insecticide comes into direct contact with the body or tissues of the insects thereby inducing suffocation and paralysis thereof. Still another class of insecticides is ovicidal and destroys the eggs of the insects by coming into direct contact with said eggs. This invention relates, in general, to new fungicides and insecticides or parasiticides having utility in the art for various purposes for which heretofore known parasiticides have been employed.

One object of the present invention is the provision of a new class of parasiticidal substances.

Another object is the provision of a new class of parasiticidal substances which are in general of relatively simple structure and can be cheaply made in commercial quantities.

Another object is the provision of a class of parasiticidal substances of the character set forth hereinafter which have particular utility alone or in combination with other parasiticides, and may be dissolved in mineral oils or dispersed or emulsified with oil or oleaginous materials and water.

Other objects and features of the invention will be apparent from a consideration of the following detailed description.

The novel parasiticidal substances of the present invention comprise, in general, halogeno-carboxylic acid esters of derivatives of alcohol amines or hydroxy-alkyl amines, particularly of lipophile derivatives of said alcohol amines or hydroxy-alkyl amines.

Many of the novel parasiticidal substances of the present invention may be represented by the general formula

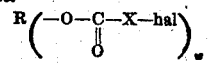

wherein R is a radical of an alcohol amine or hydroxy-alkyl amine containing an alkyl or acyl group with at least four carbons and preferably from eight to twelve carbon atoms, X is a hydrocarbon radical or a substituted hydrocarbon radical containing preferably from one to seven carbon atoms, hal is halogen, and $w$ is a small whole number, preferably one or two.

Many of said parasiticidal substances may also be represented by the general formula

wherein R denotes an organic radical, preferably aliphatic and of lower molecular weight and containing at least one halogen group, and $R_1$ denotes a radical of an alcohol amine containing a lipophile group with at least four carbon atoms.

One sub-class of the novel parasiticidal substances falls within the scope of the general formula:

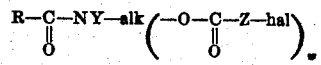

wherein R is an organic radical preferably containing at least four carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is preferably a hydrocarbon residue, containing preferably less than six carbon atoms, hal is halogen, and $w$ is a whole number, preferably one or two.

A more limited aspect of this sub-class of parasiticidal substances may be represented by the general formula

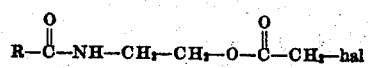

wherein R is a hydrocarbon radical or substituted hydrocarbon radical containing at least seven and preferably from eleven to seventeen carbon atoms, and hal is halogen.

Another sub-class of parasiticidal substances of the present invention may be represented by the formula

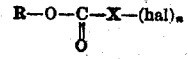

wherein R is the residue of an alcohol amine containing a plurality of esterifiable hydroxy groups and wherein the hydrogen of at least one hydroxyl group is substituted by an alkyl or acyl group containing at least four carbon atoms, X is hydrocarbon or substituted hydrocarbon containing preferably less than eight carbon atoms, hal is halogen, and $n$ is a small whole number, preferably one or two.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain from eight to fourteen carbon atoms. Z and alk, likewise, may contain substituent groups such as amino, hydroxy, halogen, sulphate, sulphonic, phosphate, carboxyl, nitrile, and the like, and the sequence of carbon atoms therein may be interrupted by O, S, C=O, NH, NR', where R' is alkyl, and the like.

In order that the nature of the invention may become more apparent, there are listed hereinbelow representative parasiticidal substances which fall within the scope of the invention. It will be understood that such substances may be utilized in the pure or impure state or in the form of reaction mixtures containing predominant or substantial proportions of said substances or in the form of mixtures of any two or more of said substances. It will further be appreciated that the higher molecular weight acyl groups, the hydroxy amine groups and the halogeno-carboxylic acid groups which enter into the formation of the various substances may be interchanged without departing from the spirit of the invention:

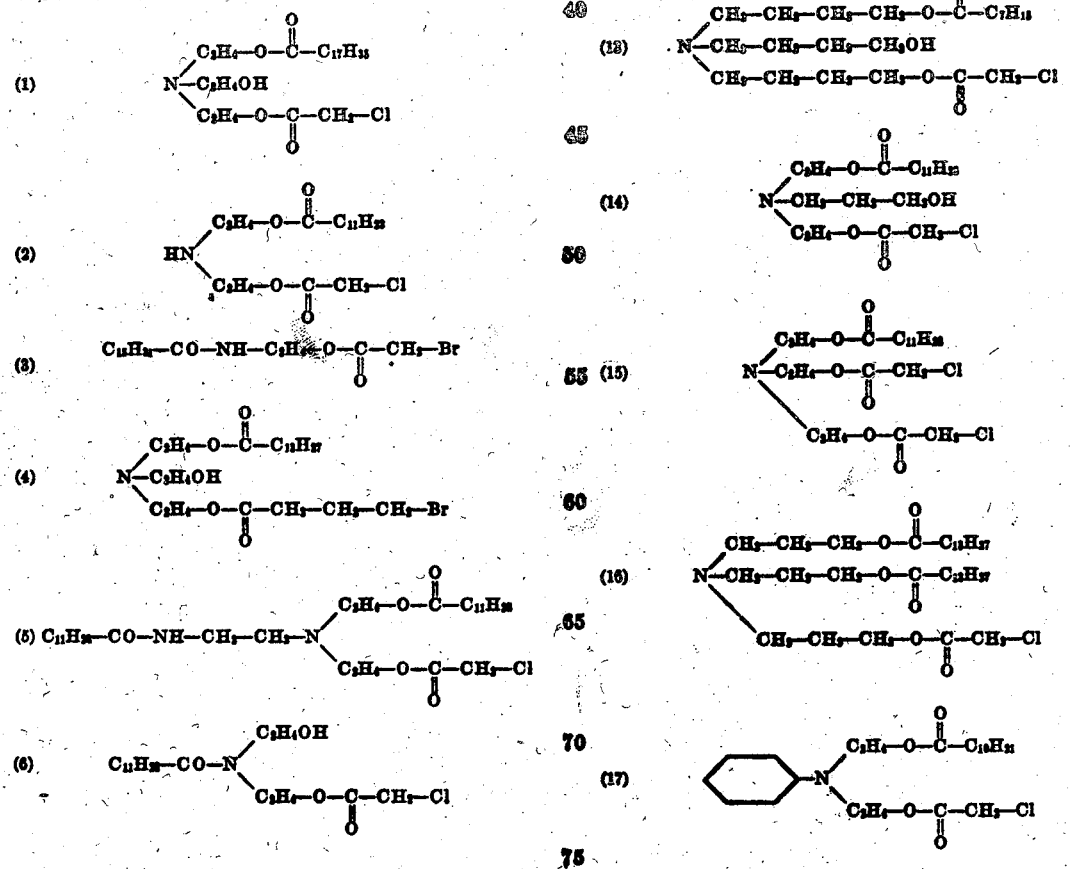

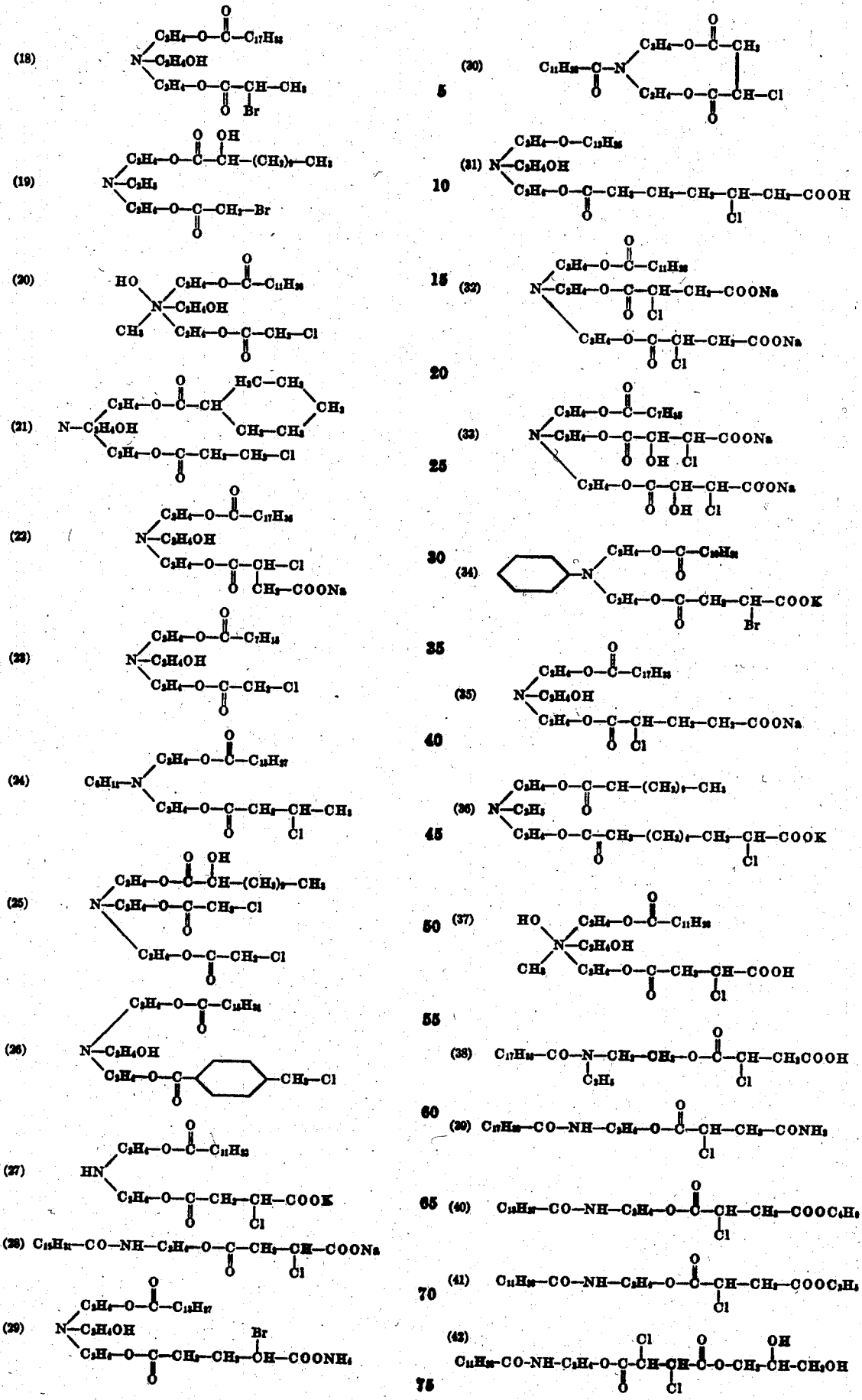

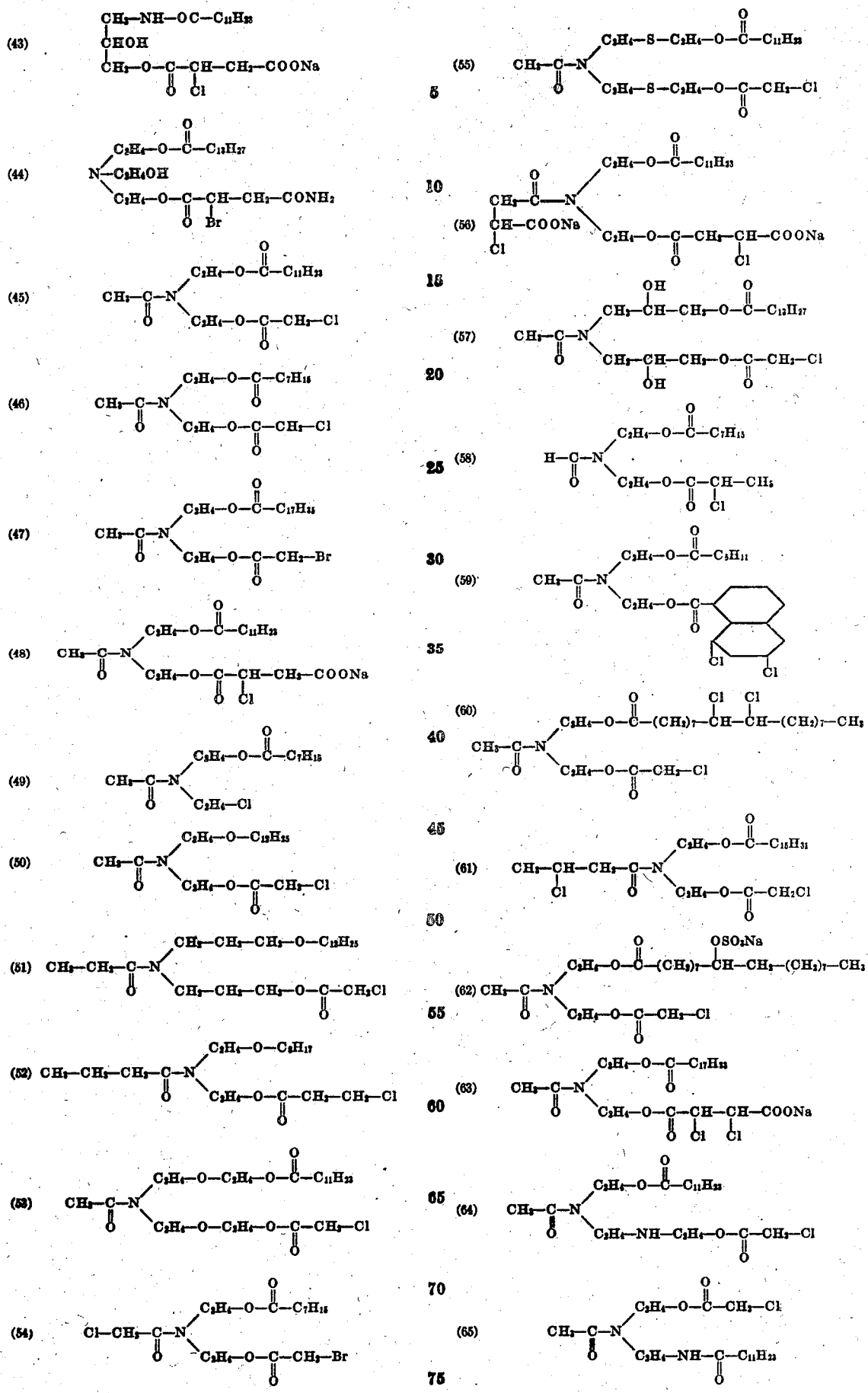

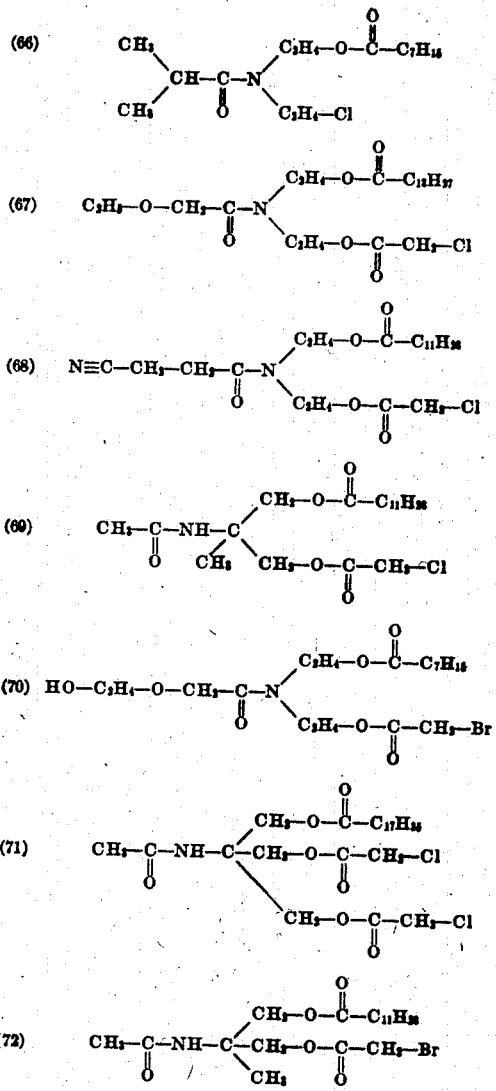

While the above examples represent single substances, it will be understood that, in practice, it is, in general, more advantageous to employ mixtures of any two or more thereof with or without diluents or to use the substances in the form of reaction mixtures.

In general, the parasiticidal substances of the present invention may be prepared by reacting a lipophile derivative of an alcohol amine, containing at least one free or esterifiable hydroxy group, for example, the lauric acid amide of monoethanolamine or the caprylic acid monoester of triethanolamine, with a halogeno-carboxylic acid such as chloracetic or bromacetic acid, or with a halogeno-carboxylic acid halide such as chloracetyl chloride or brom acetyl bromide.

In the case of the halogeno-polycarboxylic acid ester derivatives, another method of preparing said parasiticidal substances comprises reacting an unsaturated polycarboxylic acid such as, for example, maleic acid, maleic anhydride, or fumaric acid, with, for example, the caprylic acid mono-ester of triethanolamine. The resulting compound is treated with halogen, halogen acid such as hydrochloric acid, hydrobromic acid, hypochlorous acid or hypobromous acid, whereby halogen is introduced into the molecule at a double bond of the polycarboxylic acid radical.

The following examples are illustrative of methods which have been found suitable for preparing various of the parasiticidal substances which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

27.6 grams of the monocaprylic acid ester of commercial triethanolamine were dissolved in 100 cc. of petroleum ether and 11.3 grams of chloracetyl chloride were added dropwise thereto, the reaction mass being stirred and maintained at about 5 degrees C. during the addition. The mixture was then heated for about 1 hour on the boiling water bath until the petroleum ether evaporated. The resulting product was a paste.

*Example B*

27.6 grams of the monocaprylic acid ester of commercial triethanolamine, dissolved in 100 cc. of petroleum ether, were reacted with 22.6 grams of chloracetyl chloride in the manner described in Example A.

*Example C*

(1) One mol of lauric acid and about 1½ mols of monoethanolamine were heated for 5¼ hours at a temperature of 150 degrees C.–222 degrees C. while continuously passing steam through the reaction mixture while maintaining the latter under reduced pressure, until the free fatty acids were decreased to 0.3%. The resulting product comprised a mixture of about 5% of the lauric acid ester of monoethanolamine and about 95% of the lauric acid amide of monoethanolamine. The product was washed free of the excess monoethanolamine with hot water, three washings being employed and each time the product was salted out with sodium chloride. An excess of ether was then added thereto, the mass was heated to the boiling point of the ether, anhydrous sodium sulphate was added thereto, the ether layer was poured off and the ether was then evaporated.

(2) To 123 grams of the product obtained in part (1) hereof, 74 grams of chloracetic acid were added and the mixture was heated for 2 to 3 hours at 150 degrees C.–190 degrees C. The resulting product was then washed three times with hot water (80–90 degrees C.) until it was free of acid. The product was liquid at room temperature.

*Example D*

3.5 grams of a mixture of mono and di-caprylic acid esters of triethanolamine and 2.8 grams of di-brom succinic anhydride were mixed together, the temperature spontaneously rising from 25 degrees C. to 95 degrees C. at which latter temperature the reaction mass was maintained for a period of 10 minutes.

*Example E*

25.3 grams of the amide of monoethanolamine and coconut oil mixed fatty acids and 29 grams of di-brom succinic anhydride were heated together, with stirring, to 70 degrees C. The temperature spontaneously rose to 85 degrees C. and it was maintained between 85 degrees C. and 90 degrees C. for approximately 10 minutes.

Example F (1) 884 grams of corn oil and 200 grams of monoethanolamine were heated for 2 hours at a temperature between 160 degrees C. and 235 degrees C., a stream of carbon dioxide gas being continuously passed through the reaction mass.

(2) 150 grams of reaction product of part (1) hereof were washed twice, each time with 1200 cc. of boiling water, the mass being salted out after each washing. The salted out material, which comprised primarily the corn oil fatty acid amides of monoethanolamine, largely the oleic acid amide of monoethanolamine, was dried by heating to 145 degrees C. with stirring and, while hot, the sodium chloride was filtered off.

(3) 32.5 grams of the amide produced in part (2) hereof and 28 grams of di-brom succinic anhydride were warmed to 60 degrees C. The temperature spontaneously rose to 90 degrees C. at which temperature the reaction mass was held for about 10 minutes.

Example G (1) 250 grams of the coconut oil mixed higher fatty acid amides of monoethanolamine (consisting largely of the lauric acid amide of monoethanolamine) and 110 grams of maleic anhydride were mixed together and heated to 100 degrees C. for a few minutes, with stirring.

(2) To 180 grams of the reaction product of part (1) hereof, 1020 grams of a 5.5% solution of sodium hypochlorite were added and the mixture was stirred for approximately 2 hours while maintaining the same in an ice bath. The resulting product was then mixed with a solution containing 500 cc. of cold water and 300 grams of sodium chloride and, while mixing, 25 cc. of concentrated hydrochloric acid were added. The purpose of the addition of the hydrochloric acid was to liberate the free carboxylic acid derivative so that it would separate out from the reaction mass in the form of an oily layer. The wash water was then drawn off and the remaining oily layer was washed with a solution containing 1200 cc. of cold water and 300 grams of sodium chloride after which said wash water was again drawn off. The remaining said oily layer was then dissolved in ethyl ether and anhydrous sodium sulphate was added thereto to dry the product, the mass was filtered and the ether evaporated in vacuo on a hot water bath. The residue contained a substantial proportion of a compound having the following probable formula:

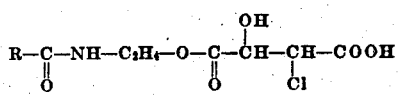

Example H 10 grams of the mono-lauric acid ester of tri-isopropyl amine and 8 grams of di-brom succinic anhydride were mixed together, the temperature spontaneously rising from 30 degrees C. to 70 degrees C. The reaction mass was then heated to 90 degrees C. at which temperature it was held for about 5 minutes.

Example I (1) 21.1 grams of the acetic acid amide of diethanolamine and 20 grams of lauric acid were heated at 200 degrees C. for 10 minutes, carbon dioxide gas being passed through the reaction mixture during the reaction in order to remove the water formed as a result of the esterification. The product was a yellow oil, essentially devoid of free fatty acid and freely dispersible in water. It had good foaming properties and by the addition of sodium chloride to the solution it could be salted out. The reaction product contained essentially the monolauric acid ester of the acetic acid amide of diethanolamine.

(2) 23.6 grams of the reaction product produced in part (1) hereof were mixed with 18.0 grams of chlor acetyl chloride. A violent reaction ensued with the evolution of hydrochloric acid, the temperature rising to about 80 degrees C. The reaction product was cooled and added to 200 cc. of cold water. It was then extracted with ethyl ether, the ethyl ether extract washed with water and the ethyl ether evaporated in vacuo. A brownish yellow limpid oily material was obtained, said material consisting essentially of a compound having the following formula:

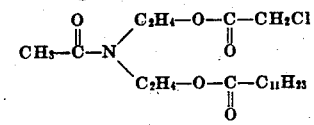

The organic radical represented by R in the general formulae may, as stated, be derived from various sources. Among such sources may be mentioned straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as l-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acids and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

The halogeno-carboxylic acids, or derivatives thereof such as esters or halides, which are reacted with the alcohol amine or alkylolamine derivatives may be selected from a relatively large class including halogen mono-, di-, and poly-carboxylic derivatives as, for example, mono chloracetic acid, mono bromacetic acid, mono iodo acetic acid, alpha-chlor propionic acid, alpha-brom propionic acid, alpha-chlor butyric acid, alpha-bromo capric acid, mono-chlor succinic acid, di-chlor succinic acid, mono-chlor succinyl chloride, di-chlor succinyl chloride, mono-chlor glutaric acid, di-chlor glutaric acid, and the corresponding halogeno derivatives of malonic acid, citraconic acid, mesaconic acid, itaconic, mucic acid, adipic acid, pimelic acid, sebacic acid, suberic acid, azelaic acid, aconitic acid, phthalic acid, and the like. Of special utility are the halogeno-acetic acids and their halides.

The alcohol amines or hydroxy amines which are utilized in the production of the parasiticidal substances of the present invention include primary, secondary and tertiary alcohol amines, symmetrical, unsymmetrical, normal and iso-derivatives, such as, among others, by way of example, monoethanolamine, diethanolamine, triethanolamine and mixtures thereof such as occur in so-called commercial triethanolamine, monopropanolamine, dipropanolamine, tripropanolamine, tri-isopropanolamine, butanolamine, isobutanolamine, dibutanolamine, pentanolamines, hexanolamines, decylolamines, laurylolamines, ethyl mono-ethanolamine; mono-ethyl ether of diethanolamine; mono-cyclohexyl, beta-hydroxy-ethyl amine; ethanol aniline, diethanolamine butanolamine; 2-methylamino-propan-diol-1,3; 1-phenylamino-propan-diol-2,3; 1-hydroxy-ethylamine-2, methoxy-propanol-3; 2-N-methylamino-propan-diol-1,3; diethanol propanol amine; monoethanol monopropanolamine, monoethanol monobutanolamine, glycerol mono-amines, namely, 1-amino-2,3-propanediol and 2-amino-1,3-propanediol; diglycerol-amine; hydroxylamine (H₂N—OH) and derivatives thereof such as result from replacement of one amine hydrogen by an alkyl such as methyl, ethyl, propyl, butyl and the higher homologues; hydroxy amines derived from polyhydric alcohols, including sugars and sugar alcohols such as dextrose, sucrose, sorbitol, mannitol and dulcitol,

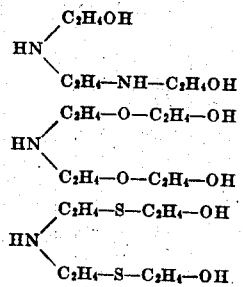

and the like; 2-amino-2-methyl-1,3-propanediol; trimethylol amino-methane; 2-amino-2-n-propyl-1,3-propanediol; 2-amino-2-isopropyl-1,3-propanediol; 2-amino-2-methyl-1,4-butanediol; 2-amino-2-methyl-1,5-pentanediol; 2-amino-2-ethyl-1,3-propanediol; 2-amino-2-ethylol-1,3-propanediol; 2-amino-2-methyl-1,6-hexanediol; 1-amino-1,1-dimethyl ethanol; trimethylol amino-methyl methane; trimethylol amino-methylol methane, alkylol polyamines such as alkylol derivatives of ethylene diamine, diethylene triamine, triethylene tetra-amine, arylolamines such as N-phenyl ethanolamine, and the like. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydroxy on the carbons to which the nitro groups are attached, and then reducing the nitro groups to amine groups. These amine groups may be further alkylated or otherwise substituted if desired. The polymerized hydroxy amines may be prepared, for example, by heating triethanolamine at elevated temperatures, particularly in the presence of a catalyst such as sodium hydroxide or the like. The preparation of polymerized hydroxy amines is disclosed, for example, in United States Patent No. 2,176,173. Because of commercial and other considerations, triethanolamine is especially desirable. It will be understood, as indicated previously, that the hydroxy amines may be utilized in pure, impure or commercial form.

The substances disclosed hereinabove, as previously described, are particularly effective, although, of course, to varying extents, as insecticides and parasiticides. In practice, it is convenient to disperse the substances in aqueous media by means of emulsifying agents such as soaps or other interface modifiers and their effectiveness may be enhanced by incorporating therewith, in the emulsion, interface modifiers with spreading and penetrating characteristics. Generally speaking, concentrations of about 1 to 1000 and 1 to 3000, depending upon the susceptibility of the insect and the potency of the substance, are usually effective for practical use.

The parasiticidal substances of the invention can be distributed as such, as solutions in organic solvents, preferably more or less concentrated, as concentrated emulsions, or, if desired, in the form of the ultimate emulsions ready for use. In general, the substances are readily soluble or miscible with oleaginous materials such as mineral oils, vegetable oils and the like. They may also be dissolved in organic liquids or solvents such as kerosene or other petroleum distillates, benzene, methyl, ethyl-, propyl- and butyl mono-ethers of glycols, or ethylene dichloride, to make dilute solutions which may be used as such for insect sprays and the like. If desired, anhydrous wetting agents may be incorporated into these latter solutions, such wetting agents comprising, by way of illustration, the sulphates of aliphatic or fatty alcohols containing from eight to eighteen carbon atoms, the corresponding phosphates and sulpho-carboxylic acid esters; gums, glue, sulfonated oils; alkali metal, ammonium and substituted ammonium or alkylolamine soaps, and the like. The proportions of the parasiticidal agents, the organic liquids, and the anhydrous wetting agents will vary depending upon the potencies and other characteristics thereof, the nature of the parasiticidal problem, and the specific character of the results desired. Those skilled in the art will, in the light of the present description and in view of existing practices in the art, readily be able successfully to practice the invention.

In many instances, it may be advantageous to utilize the novel parasiticidal agents of the present invention in conjunction with one or more known insecticidal or similar materials such as pyrethrum, derris or cube root, rotenone, nicotine salts or synthetic nicotine substitutes, aliphatic-, araliphatic-, and aromatic- thiocyano and iso-thiocyano compounds, and other compounds having parasiticidal properties. Such practice falls within the scope of the present invention.

Whenever the term "parasiticidal substance" is used in the claims, it will be understood to cover materials having insecticidal or fungicidal or similar properties or properties which serve to inhibit the growth of or destroy insects, insect eggs, fungus growths or similar undesirable plant or animal life. There is also included within the definition of this term such properties as antiseptic, disinfectant and bactericidal.

The term "residue," as used throughout the specification and claims, is employed in its ordinarily understood chemical significance. For example, where one of the hydroxyl groups of triethanolamine is esterified with a fatty acid and another of the hydroxyl groups of the triethanolamine is esterified with a halogeno-carboxylic acid, that which remains of the triethanolamine molecule, for example $$N \begin{matrix} C_2H_4- \\ -C_2H_4OH \\ C_2H_4- \end{matrix}$$

is the "residue" of the alcohol amine, in this case triethanolamine.

Similarly, the term "carbon-hydrogen residue" of a halogeno-carboxylic acid is employed as in conventional chemical nomenclature. Thus, for example, if chloracetic acid $$(HOOC-CH_2-Cl)$$

is esterified with triethanolamine, the group —CH$_2$— is to be considered as the "carbon-hydrogen residue" of the chloracetic acid.

Unless otherwise indicated, the term "higher," wherever employed in the claims, will be understood to mean at least six carbon atoms and, concomitantly, the term "lower" will mean less than six carbon atoms.

We claim:

1. Parasiticidal materials corresponding to the general formula $$R-\overset{O}{\underset{\|}{C}}-NY-alk(O-\overset{O}{\underset{\|}{C}}-Z-hal)_w$$

wherein R is an organic radical containing at least four carbon atoms, alk is a member selected from the group consisting of alkylene and arylene and substitution products thereof, Z is a member selected from the class consisting of hydrocarbon radicals and substitution products thereof, Y is a member selected from the group consisting of hydrogen, alkyl, cycloalkyl, alkoxyl, aralkyl, aryl, and alkylol, hal is halogen, and $w$ is a small whole number.

2. Parasiticidal materials corresponding to the general formula $$R-\overset{O}{\underset{\|}{C}}-NH-alk-O-\overset{O}{\underset{\|}{C}}-Z-hal$$

wherein $$R-\overset{O}{\underset{\|}{C}}$$

is an aliphatic acyl radical containing at least eight carbon atoms, alk is alkylene, Z is a hydrocarbon residue, and hal is halogen.

3. Parasiticidal materials corresponding to the general formula $$R-\overset{O}{\underset{\|}{C}}-NH-C_2H_4-O-\overset{O}{\underset{\|}{C}}-Z-hal$$

wherein $$R-\overset{O}{\underset{\|}{C}}$$

is a fatty acid acyl radical containing at least four carbon atoms, Z is a hydrocarbon radical containing less than eight carbon atoms, and hal is halogen.

4. Parasiticidal materials corresponding to the general formula $$R-\overset{O}{\underset{\|}{C}}-NY-alk-O-\overset{O}{\underset{\|}{C}}-\overset{hal}{\underset{}{Z}}-COOM$$

wherein R is an aliphatic radical containing from eight to eighteen carbon atoms, alk is a member selected from the group consisting of alkylene and arylene and substitution products thereof, Z is a member selected from the class consisting of hydrocarbon radicals and substitution products thereof, Y is a member selected from the group consisting of hydrogen, alkyl, cycloalkyl, alkoxyl, aralkyl, aryl, and alkylol, hal is halogen, and M is a cation.

5. Parasiticidal materials corresponding to the general formula R—COO—R$_1$ in which R denotes a radical containing less than eight carbon atoms and at least one halogen group, and R$_1$ denotes a radical of an alcohol amine containing a lipophile radical.

6. Parasiticidal materials corresponding to the general formula R—COO—R$_1$ in which R denotes an aliphatic radical containing less than eight carbon atoms and at least one halogen group, and R$_1$ denotes a radical of an alkylolamine containing a lipophile radical having from eight to eighteen carbon atoms.

7. Parasiticidal materials comprising halogenoacetates of alkylolamines wherein at least one amino or hydroxyl hydrogen of the alkylamine is replaced by a lipophile radical containing at least eight carbon atoms.

8. Parasiticidal materials comprising halogenoacetates of alkylolamines wherein at least one amino or hydroxyl hydrogen of the alkylolamine is replaced by an aliphatic-carboxylic acyl radical containing from eight to eighteen carbon atoms.

9. A parasiticidal composition comprising an organic solvent and a halogeno-acetate of an ethanolamine wherein the hydrogen of one hydroxyl group of the ethanolamine is substituted by a straight chain aliphatic radical having at least eight carbon atoms.

10. A parasiticidal material comprising an ester of an ethanolamine, the hydrogen of one hydroxyl group of which is substituted by a halogeno-acetic acid radical, and the hydrogen of one hydroxyl group of which is substituted by a straight chain higher molecular weight aliphatic radical containing from eight to eighteen carbon atoms.

11. Parasiticidal materials corresponding to the formula $$R-O-\overset{O}{\underset{\|}{C}}-CH_2-hal$$

wherein R is an alkylolamine radical containing a plurality of hydroxy groups and in which the hydrogen of one hydroxy group is substituted by a straight chain aliphatic radical containing at least eight carbon atoms, and hal is halogen.

12. A parasiticidal material in the form of a carboxylic ester of chlor-acetic acid, wherein the radical esterified with the chlor-acetic acid is a triethanolamine radical containing a straight chain aliphatic radical having at least eight carbon atoms.

13. A parasiticidal composition containing kerosene and a halogeno-carboxylic acid ester represented by the general formula:

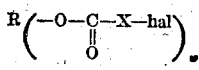

wherein R is an alcohol amine radical containing at least one lipophile group with at least four carbon atoms, X is a carbon-hydrogen radical having less than eight carbon atoms, hal is halogen, and $w$ is a small whole number, at least one.

14. Parasiticidal materials comprising halogeno-carboxylic esters corresponding to the general formula R—COO—R$_1$ in which R—COO denotes a halogeno-acetic acid radical, and R$_1$ denotes a radical of an alkylolamine esterified with a fatty acid containing from twelve to eighteen carbon atoms.

15. Parasiticidal materials comprising halogeno-carboxylic esters corresponding to the general formula R—COO—R$_1$ in which R—COO denotes a halogeno-acetic acid radical, and R$_1$ denotes a radical of triethanolamine esterified with a higher fatty acid containing from eight to eighteen carbon atoms.

16. A parasiticidal composition comprising kerosene and a chlor-acetate of an ethanolamine wherein one amino or hydroxyl hydrogen of the ethanolamine is substituted by a straight chain higher molecular weight aliphatic radical.

17. A parasiticidal composition comprising an organic solvent and a parasiticidal material comprising triethanolamine in which the hydrogen of at least one hydroxyl group is replaced by a carboxylic acyl radical having at least eight carbon atoms and in which the hydrogen of at least one hydroxyl group is replaced by a halogeno-carboxylic acid radical having less than eight carbon atoms.

18. A parasiticidal material comprising a halogeno-carboxylic acid ester of an ether derivative of an alkylolamine, the halogeno-carboxylic acid radical containing less than eight carbon atoms, and the ether radical of the derivative of the alkylolamine containing at least eight carbon atoms.

19. Parasiticidal materials comprising triethanolamine in which the hydrogen of at least one hydroxyl group is replaced by an alkyl radical having at least eight carbon atoms and in which the hydrogen of at least one hydroxyl group is replaced by a halogeno-carboxylic acid radical having less than eight carbon atoms.

20. Parasiticidal materials comprising halogeno-carboxylic acid esters of alcohol amines, the alcohol amine radical containing a lipophile group having at least eight carbon atoms, the halogeno-carboxylic acid radical containing less than eight carbon atoms.

21. Parasiticidal materials having the formula

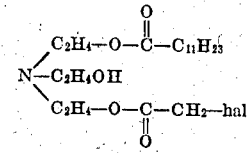

wherein hal is halogen.

22. A parasiticidal emulsion comprising an aqueous phase and a water-repelling phase, and including a chemical compound corresponding to the general formula

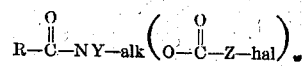

wherein R is an organic radical containing at least four carbon atoms, alk is a member selected from the group consisting of alkylene and arylene and substitution products thereof, Z is a member selected from the class consisting of hydrocarbon radicals and substitution products thereof, Y is a member selected from the group consisting of hydrogen, alkyl, cycloalkyl, alkoxyl, aralkyl, aryl, and alkylol, hal is halogen, and $w$ is a small whole number.

23. A parasiticidal emulsion comprising an aqueous material and an oleaginous material, and including a chemical compound corresponding to the general formula

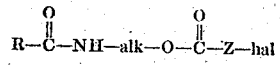

wherein

is an aliphatic acyl radical containing at least eight carbon atoms, alk is alkylene, Z is a hydrocarbon residue, and hal is halogen.

ALBERT K. EPSTEIN.
BENJAMIN R. HARRIS.